United States Patent [19]
Gemma et al.

[11] Patent Number: 4,499,536
[45] Date of Patent: Feb. 12, 1985

[54] SIGNAL TRANSFER TIMING CONTROL USING STORED DATA RELATING TO OPERATING SPEEDS OF MEMORY AND PROCESSOR

[75] Inventors: Kazutoshi Gemma, Ebina; Michiyasu Ishibashi, Hadano, both of Japan

[73] Assignee: Hitachi, Ltd., Tokyo, Japan

[21] Appl. No.: 329,048

[22] Filed: Dec. 9, 1981

[30] Foreign Application Priority Data

Dec. 17, 1980 [JP] Japan .................. 55-177290

[51] Int. Cl.³ ............................................. G06F 13/00
[52] U.S. Cl. .................................................. 364/200
[58] Field of Search ... 364/200 MS File, 900 MS File

[56] References Cited
U.S. PATENT DOCUMENTS

| | | | |
|---|---|---|---|
| 3,753,232 | 8/1973 | Sporer | 364/200 |
| 3,931,613 | 1/1976 | Gruner et al. | 364/200 |
| 3,967,249 | 6/1976 | Taniyama | 364/200 |
| 4,044,333 | 8/1977 | Auspurg | 364/200 |
| 4,075,692 | 2/1978 | Sorensen et al. | 364/200 |
| 4,090,239 | 5/1978 | Twibel | 364/200 |
| 4,191,998 | 3/1980 | Carmody | 364/200 |

Primary Examiner—James D. Thomas
Assistant Examiner—A. E. Williams, Jr.
Attorney, Agent, or Firm—Antonelli, Terry & Wands

[57] ABSTRACT

A memory controlling apparatus retains time information prepared based on performance of a memory and a processor, and determines timing of signal exchange between the memory and the processor based on the time information. An access time to the memory is reduced while maintaining a flexibility to a change of the access time due to increase of memory capacity or reconfiguration of the memory.

14 Claims, 6 Drawing Figures

FIG. 3

| $m_k$ | $ta_j$ | GFDR | ADV | BSYR | |
|---|---|---|---|---|---|
| | | | | FE \| ST | PST |
| | $ta_1$ | $C_i$ | $C_{i+1}$ | $C_i$ | $C_{i+2}$ |
| $m_1$ | $ta_2$ | $C_{i+1}$ | $C_{i+2}$ | $C_{i+1}$ | $C_{i+3}$ |
| | $ta_3$ | $C_{i+2}$ | $C_{i+3}$ | $C_{i+2}$ | $C_{i+4}$ |
| | $ta_1$ | $C_{i+1}$ | $C_{i+2}$ | $C_{i+1}$ | $C_{i+3}$ |
| $m_2$ | $ta_2$ | $C_{i+2}$ | $C_{i+3}$ | $C_{i+2}$ | $C_{i+4}$ |
| | $ta_3$ | $C_{i+3}$ | $C_{i+4}$ | $C_{i+3}$ | $C_{i+5}$ |
| | $ta_1$ | $C_{i+2}$ | $C_{i+3}$ | $C_{i+2}$ | $C_{i+4}$ |
| $m_3$ | $ta_2$ | $C_{i+3}$ | $C_{i+4}$ | $C_{i+3}$ | $C_{i+5}$ |
| | $ta_3$ | $C_{i+4}$ | $C_{i+5}$ | $C_{i+4}$ | $C_{i+6}$ |

FIG. 4

| CONDITION / SIGNAL | $S_0$ | $S_1$ | $S_2$ | $S_3$ | $S_4$ | TYPE OF ACCESS |
|---|---|---|---|---|---|---|
| GFDR | $C_i$ | $C_{i+1}$ | $C_{i+2}$ | $C_{i+3}$ | $C_{i+4}$ | FE, ST, PST |
| ADV | $C_{i+1}$ | $C_{i+2}$ | $C_{i+3}$ | $C_{i+4}$ | $C_{i+5}$ | FE |
| BSYR | $C_i$ | $C_{i+1}$ | $C_{i+2}$ | $C_{i+3}$ | $C_{i+4}$ | FE, ST |
| | $C_{i+2}$ | $C_{i+3}$ | $C_{i+4}$ | $C_{i+5}$ | $C_{i+6}$ | PST |

F I G. 5
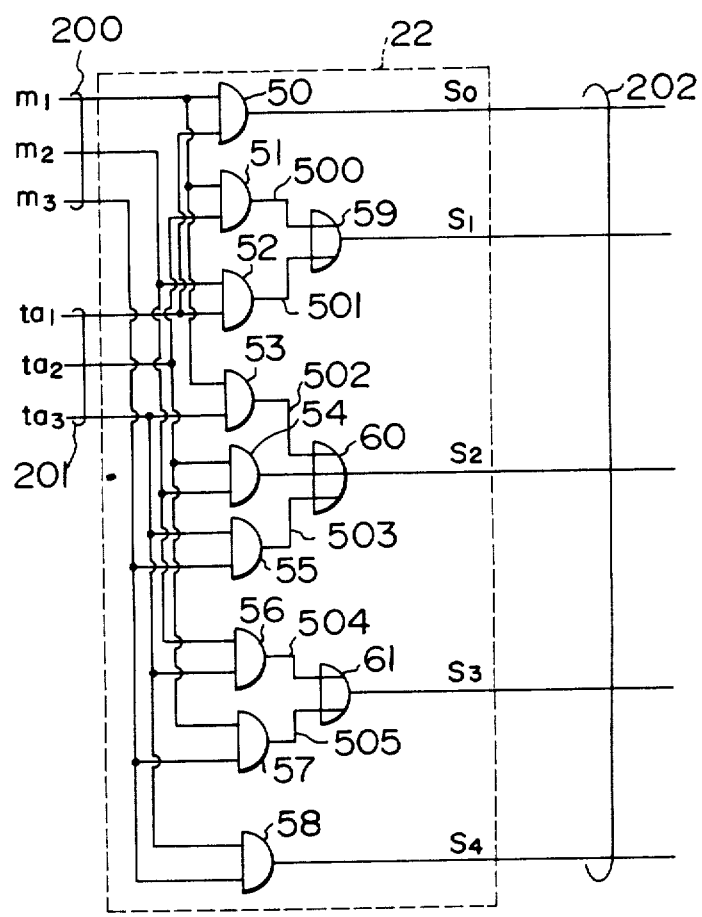

SIGNAL TRANSFER TIMING CONTROL USING STORED DATA RELATING TO OPERATING SPEEDS OF MEMORY AND PROCESSOR

FIELD OF THE INVENTION

The present invention relates to a memory controlling apparatus for controlling transfer of signals between a memory and a processor in a data processing system which includes the memory for storing data and the processor for processing data accessed to the memory.

BACKGROUND OF THE INVENTION

In a conventional data processing system, the functions of the main memory and the processor for processing data read out of the memory are clearly separated. In addition, in a large scale data processing system which needs a relatively large memory capacity, the main memory and the processor are, in many cases, physically separated.

In such data processing systems, a definite convention relating to the transfer of data is predetermined between the processor and the main memory, and the processor accesses the main memory for data in accordance with that convention. A unit which directly shares the access control to the main memory is called a memory controlling apparatus, and a memory controlling apparatus portion in the processor is herein called a memory controlling unit or storage controlling unit (SCU). The convention relating to the data transfer between the SCU and the main memory is called an interface.

In one of the prior art interface techniques, information concerning the type of access and a start pulse are sent from the SCU to the main memory, and the main memory, when it receives them, sends back a completion signal to the SCU after it has completed the requested operation. When the SCU receives the completion signal, it reads in the data or proceeds to the next process.

In this system, since the processor proceeds to the next process after it has received the completion signal from the main memory, a physical distance between the main memory and the processor does not affect the operation. Accordingly, even if the access time to the main memory as viewed from the SCU changes as a result of an increase of the memory capacity of the main memory or the reconfiguration of the main memory, the logic circuit need not be modified. The main memory can be used with various processors so long as the interface is common. However, because of loss of synchronization in the transfer of the start signal and the completion signal between the SCU and the main memory, the effective access time to the main memory as viewed from the SCU increases. In addition, since the transfer of information must be managed in the SCU and the main memory, the logical scale of the entire data processing system increases.

In order to avoid the above difficulties, in another prior art interface technique between the main memory and the SCU, the SCU carries out time control for the access to the main memory. In this system, after the SCU has sent the start signal to the main memory, it watches for an elapsed time which is determined in accordance with the type of access. For example, for a read operation, the SCU counts an elapsed time from the start signal, and after a predetermined time has elapsed the SCU instructs the main memory to send out the data to a data bus and the SCU loads the data on the data bus to a data register.

Since the SCU carries out the time control from the start of access to the main memory to the completion of the access, the time loss and the increase of the logic circuits concerning the data exchange are reduced as compared with the first-mentioned prior art system.

However, although this system resolves the difficulties encountered in the first-mentioned prior art system, it cancels out the advantage of the prior art system. In this system, the time system for the signal transfer in the interface between the processor and the main memory connected thereto is fixed for a given physical configuration, circuit configuration and control system, and hence the flexibility in effecting a change of the time system is lost. Consequently, this system is disadvantageous when the memory capacity of the main memory is increased, the memory configuration is changed, the access time is changed due to the development of faster memory cells, or the main memory is connected to a different processor.

SUMMARY OF THE INVENTION

It is an object of the present invention to provide an improved memory controlling apparatus which resolves the difficulties encountered in the prior art.

It is another object of the present invention to provide an economic memory controlling apparatus which can reduce the access time to a main memory and has a flexibility for effecting change of the access time due to increase of the memory capacity of the memory or reconfiguration of the memory.

According to a feature of the present invention, time information prepared based on performance of at least the memory and the processor is retained in the memory controlling apparatus, which then controls the signal transfer between the memory and the processor based on at least this retained time information.

BRIEF DESCRIPTION OF THE DRAWING

The present invention will now be described in conjunction with the accompanying drawings, in which:

FIGS. 3 and 4 show charts for explaining the operations of control circuits 22 and 27 shown in FIG. 2;

FIG. 5 shows a detail of the control circuit 22 shown in FIG. 2; and

DESCRIPTION OF THE PREFERRED EMBODIMENT

One embodiment of the present invention in which the present invention is applied to an SCU for controlling the signal exchange between a main memory and a processor of a data processing system will now be explained.

Figure 1:
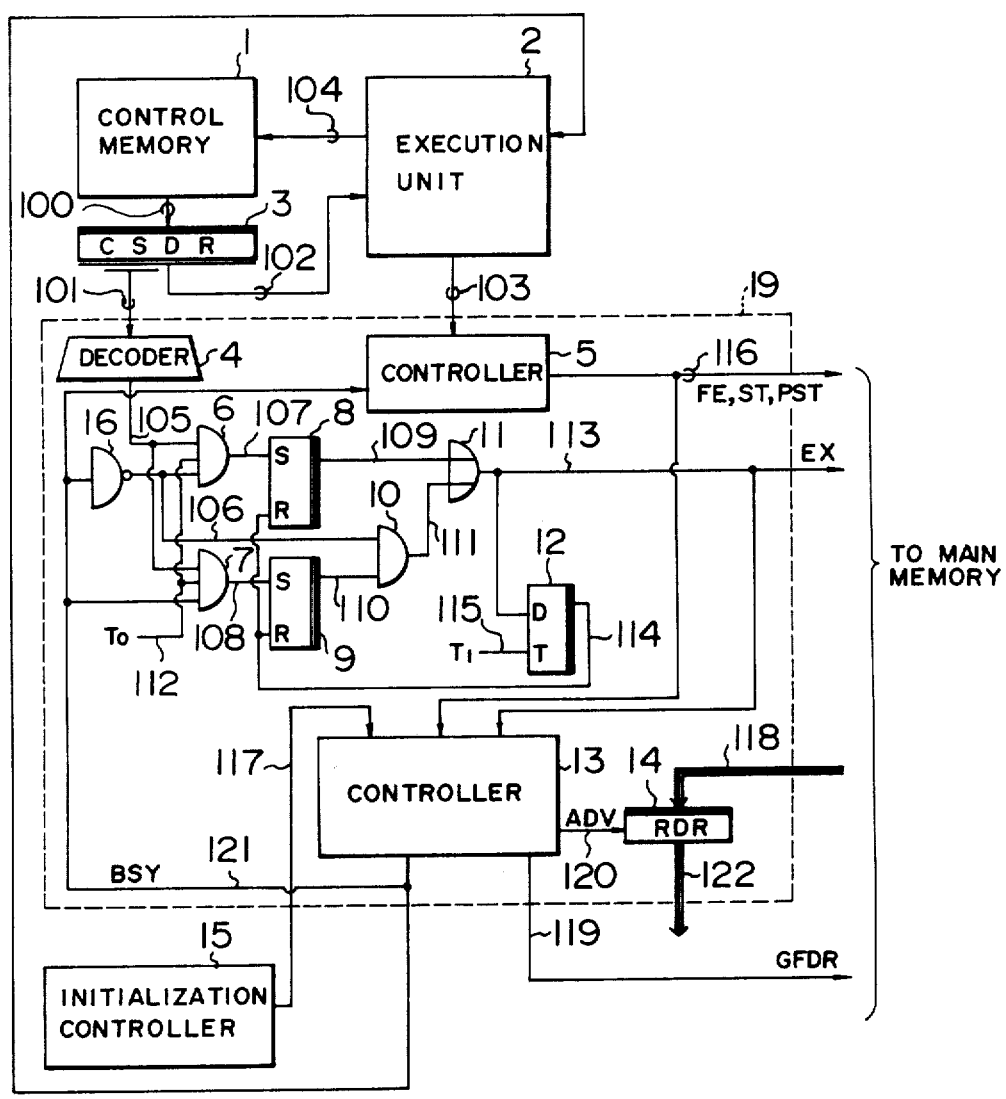
FIG. 1 shows a block diagram of a processor in accordance with one embodiment of the present invention.

FIG. 1 shows the processor, particularly those portions thereof which are closely related to the present invention. Microinstructions are sequentially loaded into a microinstruction load register (CSDR) 3 from a control memory 1 which stores the microinstructions, through a signal line 100. The microinstructions are decoded and executed by related units to execute a series of processes in the processor. The sequence of execution is instructed by an execution unit 2 through a signal line 104. The execution sequence of the microprogram has been well known and hence it need not be discussed here. Regarding the microinstruction loaded into the CSDR 3, a field indicating whether or not a main memory access is to be started is sent to a storage control unit (SCU) 17 through a signal line 101. On the other hand, the content of the CSDR 3 is sent to the execution unit 2 through a signal line 102 and control information concerning the main memory access is sent to the SCU 19 through a signal line 103. The control information includes information on the type of the main memory access, that is, read (FE), full write (ST) and partial write (PST).

The content on the signal line 101 is decoded by a decoder 4. When the main memory access is to be started, an output signal 105 of the decoder 4 is "1". If a main memory busy signal (BSY) to be explained later, on a signal line 121 is "0" at this time, a signal 106 from an inverter 16 is "1" and an output signal 107 from an AND gate 6 assumes the level "1" in synchronism with a timing signal $T_a$ supplied through a signal line 112 so that a flip-flop (FF) 8 is set and an output signal 109 of the FF 8 assumes "1". If the signal BSY is "1", an output signal 108 of an AND gate 7 is "1" so that a flip-flop (FF) 9 is set and an output signal 110 of the FF 9 assumes the level "1". Under this condition, if the signal BSY on the signal line 121 changes to "0", an output signal 111 of an AND gate 10 assumes the level "1". Either one of the signals 109 and 111 is "1" in one main memory access and it is supplied to a signal line 113 through an OR gate 11 and sent to a main memory (not shown) as the main memory access start signal (EX). When the signal line 113 is "1", a FF 12 is set at a timing signal $T_1$ and the FF 8 or FF 9 is reset by an output signal 114 of the FF 12 so that the signal EX on the signal line 113 is shaped into a predetermined pulse width.

On the other hand, the control information concerning the type of the main memory access sent from the execution unit 2 through the signal line 103 is processed by a controller 5 which produces an output on a signal line 116, which is then sent to the main memory.

The feature of the present invention resides in a controller 13. The controller 13 is connected to the signal lines 113 and 116 and also to an initialization controller 15 in the processor through a signal line 117. The controller 13 sends out the signal BSY in the SCU 19 and to the execution unit 2 through the signal line 121. It also sends out on a signal line 119 a signal (GFDR) for instructing the main memory to send the readout data to a data bus 118, and sends out on a signal line 120 a signal (ADV) for instructing a read data register (RDR) in the processor to read the data sent through the data bus 118. The data read in the RDR 14 is sent to the processor through a data bus 122 and processed under the control of the execution unit 2.

Figure 2:
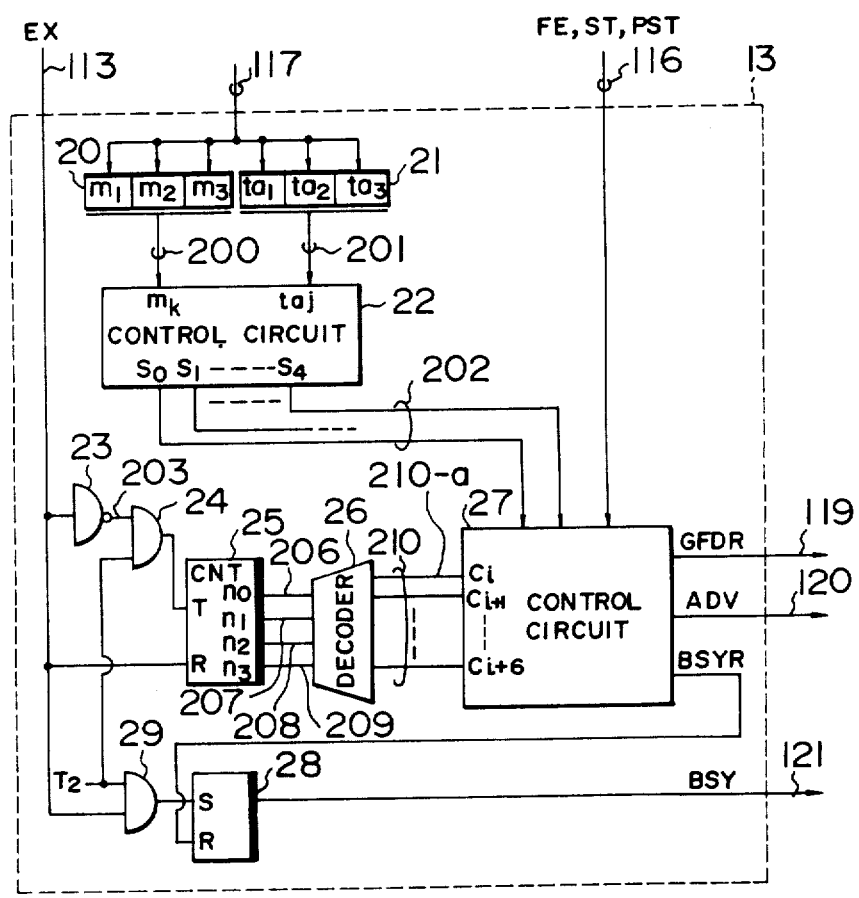
FIG. 2 shows a detail of a controller 13 shown in FIG. 1.

FIG. 2 shows the details of the controller 13 shown in FIG. 1. The controller 13 comprises configuration registers 20 and 21 which retain identification flags for the machine cycle of the processor and identification flags concerning the access time of the main memory cells, respectively, a control circuit 22 for producing signals $S_0 \sim S_4$ to be described later in accordance with the contents of the configuration registers 20 and 21, a counter 25 for counting an elapsed time after the signal EX of a predetermined pulse width has been produced, a decoder 26 for decoding the count of the counter 25, a control circuit 27 for producing the signals GFDR and ADV and a busy reset signal (BSYR) for producing the signal BSY, based on the decoded output of the decoder 26, the output signal 202 of the control circuit 22 and the signal FE, ST or PST on the signal line 116 indicating the type of the main memory access, and a flip-flop (FF) 28 for generating the signal BSY.

The configuration register 20 can retain three machine cycle identification flags $m_1$, $m_2$ and $m_3$, and the configuration register 21 can retain three main memory cell identification flags $ta_1$, $ta_2$ and $ta_3$. In the initialization of the processor, one of the identification flags $m_1$ to $m_3$ and one of the identification flags $ta_1$ to $ta_3$ are set to "1" (scanned in) through the signal line 117. This operation may be carried out by a known technique, such as by loading a microprogram into the control memory during the initialization of the processor or by loading predetermined values into a conventional configuration control register (not shown). The outputs from the configuration registers 20 and 21 are supplied to the control circuit 22 through signal lines 200 and 201.

The signal EX is applied to an AND gate 29 which sets the FF 28 at the timing signal $T_2$ to set the main memory busy signal BSY to "1". The signal EX is also applied to a reset terminal (R) of the counter 25 to initialize the counter 25. When the signal EX is "0", a signal 203 from an inverter 23 opens an AND gate 24. The counter thus starts to count the timing signal $T_2$ which is in synchronism with the machine cycle, from the time point at which the signal EX assumes the level "0". Output terminals $n_0 \sim n_3$ of the counter 25 correspond to count digits $2^0 \sim 2^3$, respectively, and those outputs are supplied to the decoder 26 through signal lines $206 \sim 209$.

The configuration of the decoder 26 is determined depending on send timings $C_i \sim C_{i+6}$ of the signals GFDR, ADV and BSYR to be described later. For example, when $C_i$ represent five machine cycles, an output signal line 210-a is "1" when the outputs $n_3$, $n_2$, $n_1$ and $n_0$ are "0", "1", "0" and "1", respectively. The configuration of the decoder 26 has been known and hence it need not be discussed in detail.

The output signal BSYR from the control circuit 27 is applied to the reset terminal R of the FF 28 which produces the signal BSY. Thus, when the signal BSYR is "1", the signal BSY is reset to "0".

FIGS. 3 and 4 show charts for explaining the operations of the control circuits 22 and 27.

FIG. 3 shows the relation between the combinations of the identification flags $m_k$ ($k=1 \sim 3$) and $ta_j$ ($j=1 \sim 3$) and the send timings of the signals GFDR, ADV and BSYR. The send timings are represented by the counts $C_i \sim C_{i+6}$ of the number of machine cycles counted after the signal EX has been produced. Those counts are predetermined based on the response performance of the processor and the main memory. For example, when the identification flags $m_1$ and $ta_1$ are set to "1", respectively, the signal GFDR is sent at the timing $C_i$ and the signal ADV is sent at the timing $C_{i+1}$. The signal BSYR is sent at the timing $C_i$ when the type of the main memory access is FE or ST, and at the timing $C_{i+2}$ when the type of the main memory access is PST.

From FIG. 3, it is seen that the send timings of the signals GFDR, ADV and BSYR spread over $C_i \sim C_{i+4}$, $C_{i+1} \sim C_{i+5}$ and $C_i \sim C_{i+6}$, respectively. The send timings $C_i \sim C_{i+6}$ of the signal BSYR are further divided into $C_i \sim C_{i+4}$ and $C_{i+2} \sim C_{i+6}$ depending on the type of the main memory access. Accordingly, the send timings of the signals are classified into five groups and the send timings of the signals may be selected from those groups.

In FIG. 4, the send timings of the signals GFDR, ADV and BSYR shown in FIG. 3 are classified to facilitate logic circuit design. The five groups of the send timings of the signals are represented by $S_0 \sim S_4$. In the condition $S_0$, the send timing of the signal GFDR is $C_i$, in the condition $S_1$ it is $C_{i+1}$, in the condition $S_2$ it is $C_{i+2}$, in the condition $S_3$ it is $C_{i+3}$ and in the condition $S_4$ it is $C_{i+4}$. The send timings of the signals ADV and BSYR are similarly classified. The chart of FIG. 4 also includes the types of the main memory access by which the respective signals are sent out. The signal GFDR is sent out by FE, ST or PST, the signal ADV is sent out by FE and the signal BSYR is sent by FE, ST or PST. The send timing of the signal BSYR by FE or ST is different from the send timing of the signal BSYR by PST.

FIG. 5 shows an embodiment of the control circuit 22 for producing signals $S_0 \sim S_4$ corresponding to the conditions $S_0 \sim S_4$ of FIG. 4 based on the identification flags $m_k$ (k $1 \sim 3$) and $ta_j$ (j=$1 \sim 3$). In FIG. 5, numerals 50-58 denote AND gates and numerals 59-61 denote OR gates.

Referring to FIG. 5, when the machine cycle identification flag $m_1$ is "1" and the main memory cell identification flag $ta_1$ is "1", an output of the AND gate 50 is "1" and the signal $S_0$ is produced. When $m_1$ is "1" and $ta_2$ is "1", or when $m_2$ is "1" and $ta_1$ is "1", an output 500 of the AND gate 51 or an output 501 of the AND gate 52 is "1" and the signal $S_1$ is produced from the OR gate 59. Similarly, one of the signals $S_0 \sim S_4$ is produced depending on a particular combination of $m_k$ (k=$1 \sim 3$) and $ta_j$ (j=$1 \sim 3$).

Figure 6:
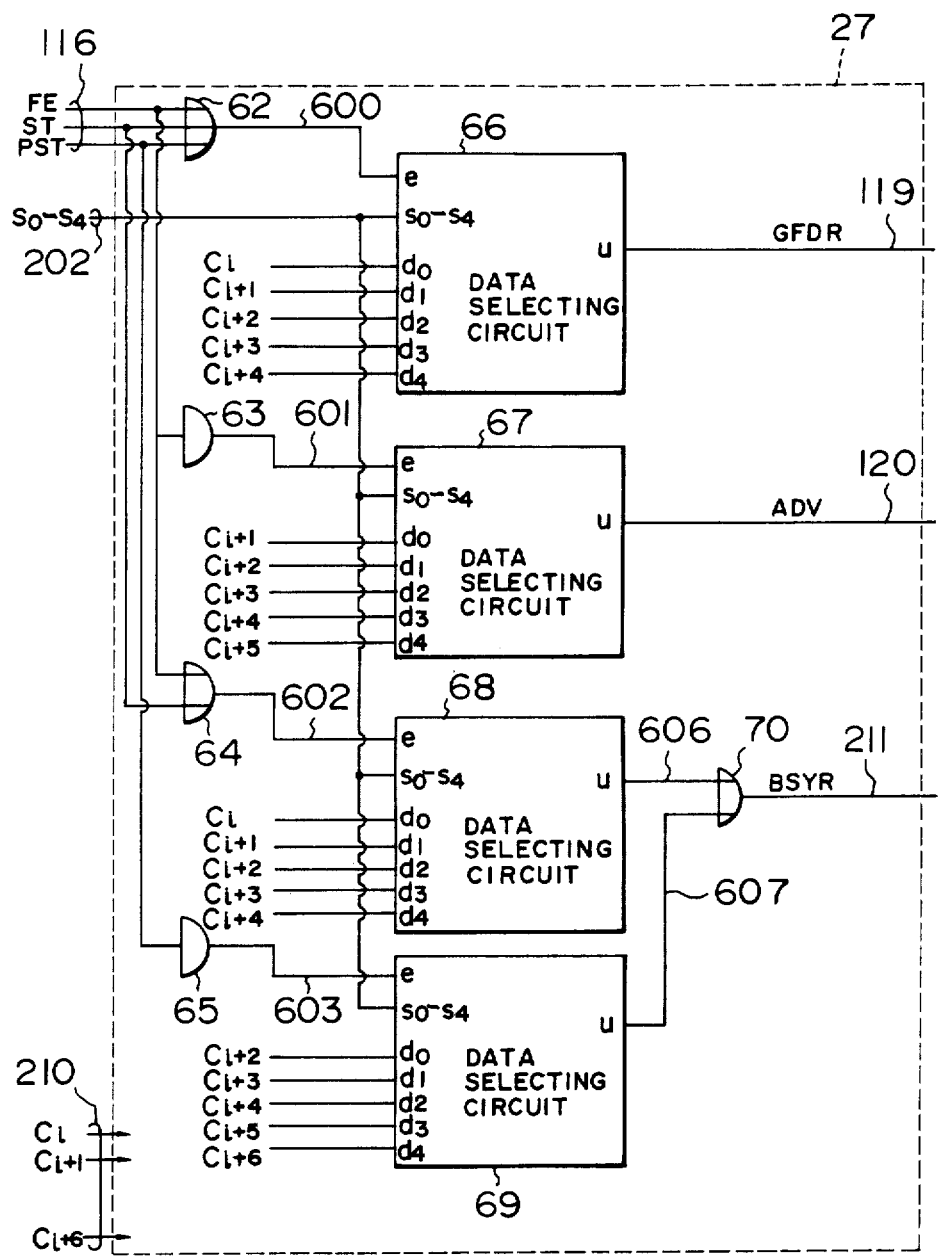
FIG. 6 shows a detail of the control circuit 27 shown in FIG. 2.

FIG. 6 shows a circuit for finally producing the signals GFDR, ADV and BSYR and it shows an embodiment of the control circuit 27 of FIG. 2. The control circuit 27 receives the signal on the signal line 116 indicating the type of the main memory access (FE, ST, PST), the output signals 202 ($S_0 \sim S_4$) of the control circuit 22 shown in FIG. 5 and the output signals 210 ($C_i \sim C_{i+6}$) of the decoder 26 shown in FIG. 2.

Numerals 66-69 denote data selecting circuits each of which selects one of the output signals 210 ($C_i \sim C_{i+6}$) of the decoder 26 applied to input terminals $d_0 \sim d_4$, by the output signals 202 ($S_0 \sim S_4$) of the control circuit 22 applied to select signal terminals $s_0 \sim s_4$ and produces the selected signal at an output terminal u. The input to the input terminal $d_0$ is produced at the output terminal u when $S_0$ is "1", the input to $d_1$ is produced when $S_1$ is "1", the input to $d_2$ is produced when $S_2$ is "1", the input to $d_3$ is produced when $S_3$ is "1", and the input to $d_4$ is produced when $S_4$ is "1".

The data selecting circuits 66-69 each have an enable terminal e. Except when a signal applied to the enable terminal e is "1", the output signal at the output terminal u is "0". Such data selecting circuits have been known and hence need not be explained in detail.

In order for the control circuit 27 to produce the signal GFDR, ADV or BSYR in accordance with the chart of FIG. 4, the signals $C_i \sim C_{i+4}$ are applied to the input terminals $d_0 \sim d_4$ of the data selecting circuit 66, and an output signal 600 of an OR gate 62 which is "1" when the type of the main memory access is FE, ST or PST, is applied to the enable terminal e. The signals $C_{i+1}, C_{i+2}, C_{i+3}, C_{i+4}$ and $C_{i+5}$ are applied to the input terminals $d_0 \sim d_4$ of the data selecting circuit 67 and an output signal 601 of an OR gate 63, which is "1" when the type of the main memory access is FE, is applied to the enable terminal e. The signals $C_i, C_{i+1}, C_{i+2}, C_{i+3}$ and $C_{i+4}$ are applied to the input terminals $d_0 \sim d_4$ of the data selecting circuit 68 and an output signal 602 of an OR gate 64, which is "1" when the type of the main memory access is FE or ST, is applied to the enable terminal e. The signals $C_{i+2}, C_{i+3}, C_{i+4}, C_{i+5}$ and $C_{i+6}$ are applied to the input terminals $d_0 \sim d_4$ of the data selecting circuit 69 and an output signal 603 of an OR gate 65, which is "1" when the type of the main memory access is PST, is applied to the enable terminal e. The output signals 606 and 607 of the data selecting circuits 68 and 69 are supplied to an OR gate 70, which produces the signal BSYR.

According to the present apparatus, the following advantages are attained:

(i) The main memory access time can be reduced because the processor controls the access to the main memory.

(ii) For a change of the main memory access time due to an increase of the main memory capacity or a reconfiguration of the main memory, the time system of the main memory interface can be flexibly changed by changing the content of the configuration register in the processor. Accordingly, a maximum main memory access performance can be maintained without redesigning the circuit.

(iii) When one main memory is connected to various processors, the performance of the processor and the performance of the main memory can be optimally matched by providing the present memory controlling apparatus in the processors so that the respective processors can attain the maximum main memory access performance.

(iv) When the present invention is applied to a variable machine cycle processor, a maximum main memory access performance is attained in each machine cycle.

In the illustrated embodiments, the configuration registers 20 and 21 each indicates the send timings of the signals shown in FIG. 3 when one of the flags is set to "1". The send timing may be indicated in different ways. For example, the configuration register may directly retain the counts $C_i \sim C_{i+6}$ of the number of cycles after the signal EX has been produced. In a system which uses the processor and the main memory corresponding to the combination of $m_2$ and $ta_3$, for example, the counts $C_{i+3}$; $C_{i+4}$; and $C_{i+3}$ and $C_{i+5}$ corresponding to the signals GFDR, ADV and BSYR, respectively, are stored in the configuration register. Each of those counts is compared with the count of the counter 25, and when they are equal the corresponding signal is produced.

While the signals GFDR, ADV and BSYR are used in the illustrated embodiments as signals having send timing which are controlled by the contents of the configuration registers 20 and 21, other signals may be controlled.

While te occurrence of the signal EX is used as the reference to the send timings of the signals in the illustrated embodiments, other signals may be used as the reference.

What is claimed is:

1. A memory controlling apparatus for controlling signal transfer between a memory for storing data and a processor for processing the data accessed to said memory, comprising:
   means for retaining time information based on the operating speed of at least said memory and said processor, including means for receiving from said processor and storing respective data relating to the operating speed of said processor and the operating speed of said memory; and
   control means for controlling the timing of signal transfer between said processor and said memory based on at least said time information of said retaining means, including first means responsive to said processor for transmitting a memory access signal to said memory and second means connected to said receiving and storing means and responsive to said access signal for transmitting to said memory a signal to command said memory to transmit data to said processor at a time subsequent to transmission of said memory access signal which is determined by said data relating to the operating speed of said memory and said processor as stored in said receiving and storing means.

2. A memory controlling apparatus according to claim 1 wherein said control means comprises means for controlling said timing of said signal transfer based on said time information and the type of access to said memory.

3. A memory controlling apparatus according to claim 1 wherein said receiving and storing means comprises means for storing the access time of the memory cells of said memory and information concerning the machine cycle time of said processor.

4. A memory controlling apparatus according to claim 2, wherein said receiving and storing means comprises means for storing the access time of memory cells of said memory and information concerning the machine cycle time of said processor.

5. A memory controlling apparatus according to claim 1 wherein said second means in said control means comprises counter means for counting signals generated in synchronism with a machine cycle of said processor and means responsive to the output of said counter means and the output of said first means for producing said signal to command said memory to transmit data when the count of said counter means reaches a predetermined count in relation to the data relating to the operating speed of said memory and said processor as stored in said receiving and storing means.

6. A memory controlling apparatus according to claim 2, wherein said second means in said control means comprises counter means for counting signals generated in synchronism with a machine cycle of said processor and means responsive to the output of said counter means and the output of said first means for producing said signal to command said memory to transmit data when the count of said counter means reaches a predetermined count in relation to the data relating to the operating speed of said memory and said processor as stored in said receiving and storing means.

7. A memory controlling apparatus according to claim 5, wherein said receiving and storing means comprises means for storing the access time of the memory cells of said memory and information concerning the machine cycle time of said processor.

8. A memory controlling apparatus according to claim 6, wherein said receiving and storing means comprises means for storing the access time of the memory cells of said memory and information concerning the machine cycle time of said processor.

9. A memory controlling appartus according to claim 5, wherein said first means in said control means comprises logic circuit means for producing output control signals which represent a predetermined logical relationship between the data relating to the operating speed of said processor and the data relating to the operating speed of said memory as provided by said receiving and storing means.

10. A memory controlling apparatus according to claim 9, wherein said second means in said control means includes decoder means for producing timing signals in response to the output of said counter means, and third means responsive to said timing signals from said decoder means and said output control signals from said logic circuit means for producing said signal to command said memory to transmit data.

11. A memory controlling apparatus according to claim 10, wherein said counter means is connected to receive said start signal from said processor so as to be reset thereby.

12. A memory controlling apparatus according to claim 6, wherein said first means in said control means comprises logic circuit means for producing output control signals which represent a predetermined logical relationship between the data relating to the operating speed of said processor and the data relating to the operating speed of said memory as provided by said receiving and storing means.

13. A memory controlling apparatus according to claim 12, wherein said second means in said control means includes decoder means for producing timing signals in response to the output of said counter means, and third means responsive to said timing signals from said decoder, said output control signals from said logic circuit means and signals from said processor as to the type of access to said memory for producing said signal to command said memory to transmit data.

14. A memory controlling apparatus according to claim 13, wherein said counter means is connected to receive said start signal from said processor so as to be reset thereby.

* * * * *